(12) United States Patent
Morishita

(10) Patent No.: US 6,366,068 B1
(45) Date of Patent: Apr. 2, 2002

(54) SWITCHING POWER SUPPLY WITH OVERCURRENT PROTECTION AND METHOD

(75) Inventor: Yasunobu Morishita, Nagaokakyo (JP)

(73) Assignee: Murata Manufacturing, Co., Ltd. (JP)

( * ) Notice: Subject to any disclaimer, the term of this patent is extended or adjusted under 35 U.S.C. 154(b) by 0 days.

(21) Appl. No.: 09/650,454

(22) Filed: Aug. 29, 2000

(30) Foreign Application Priority Data

Sep. 6, 1999 (JP) .............................................. 11-252210

(51) Int. Cl.[7] ................................................ G05F 1/40
(52) U.S. Cl. ...................................... 323/282; 323/284
(58) Field of Search ................................ 323/282, 284, 323/303, 311, 312, 908, 265, 266, 259

(56) References Cited

U.S. PATENT DOCUMENTS 5,926,012 A * 7/1999 Takizawa et al. ........... 323/284

* cited by examiner

*Primary Examiner*—Peter S. Wong
*Assistant Examiner*—Gary L. Laxton
(74) *Attorney, Agent, or Firm*—Ostrolenk, Faber, Gerb & Soffen, LLP

(57) ABSTRACT

A switching power supply comprises: a primary switching element for controlling an output voltage or an output current by switching the current of an input power supply circuit; a current detection circuit for detecting a current flowing through said primary switching element, based on the potential difference occurring across the ends of said primary switching element; and a switching control circuit for controlling said primary switching element so that the current does not exceed a predetermined value.

7 Claims, 3 Drawing Sheets

SWITCHING POWER SUPPLY WITH OVERCURRENT PROTECTION AND METHOD

BACKGROUND OF THE INVENTION

1. Field of the Invention

The present invention relates to switching electrical power supplies, and more specifically, it relates to a switching power supply with overcurrent protection.

2. Description of the Related Art

Hitherto, a switching power supply has been provided with overcurrent protection in order to protect the switching power supply itself and a load when an excessive output current flows due to an overload state caused by the occurrence of a short circuit for some reason at the output side of the power supply.

FIG. 4 shows a conventional switching power supply with such overcurrent protection. In FIG. 4, Q1 denotes a primary switching element, which is typically constructed using MOS-FET[s]. A switching control circuit 10 performs on-off control by applying a control voltage to the gate of the primary switching element Q1. An input power supply E is connected to the drain of the primary switching element Q1. The input power supply E is connected in parallel with a smoothing capacitor C1. The source side of the primary switching element Q1 is connected to a rectifier smoothing circuit including a rectifier circuit 2, an inductor 3, and a capacitor C2. A current detection resistor 11 is inserted between the output of the rectifier smoothing circuit and a load 4. The potential difference across the ends of the current detection resistor 11 is input to a current detection circuit 12, from which a voltage signal in accordance with the input potential difference is output to the switching control circuit 10.

If the voltage output from the current detection circuit 12 has a value corresponding to a state in which an output current flowing into the load 4 exceeds a predetermined upper limit value, the switching control circuit 10 limits the ON period of the primary switching element Q1 so as to be shorter or limits the ON period thereof so as not to be longer than the predetermined upper limit value. Thus, the overcurrent protection is performed.

However, in a switching power supply provided with such a conventional current detection circuit, since the current detection resistor (11) for detecting the output current to the load is disposed in a main current path, electrical power loss is generated at this current detection resistor and the power conversion efficiency of the power supply is reduced. Furthermore, since heat is generated due to electrical power loss occurring at the current detection resistor, a large resistor must be used. Accordingly, there are problems in that the overall power supply becomes large and cost reduction cannot be achieved.

SUMMARY OF THE INVENTION

The present invention is directed to a switching power supply which solves the foregoing various problems by providing overcurrent protection without using the current detection resistor.

This invention is made by paying attention to a change of a voltage drop caused by a primary switching element in accordance with a current flowing through the primary switching element. That is, a switching power supply is provided with the primary switching element for controlling an output voltage or an output current by switching a current of an input power supply, a current detection circuit for detecting the current flowing through the primary switching element, based on the potential difference across the ends of the primary switching element, and a switching control circuit for controlling the primary switching element so that the current does not exceed a predetermined value.

The current flowing during the ON period of the primary switching element has a correlation, such as being approximately proportional, to the output current through a load, and by detecting the current flowing through the primary switching element, based on the potential difference across the ends of the primary switching element, the output current through the load can be indirectly detected. Accordingly, since a conventional current detection resistor is not required, electrical power loss due to the current-detecting resistor is not generated and problems caused by the heating do not occur.

When the primary switching element is ON, this invention is provided with a timing control circuit for issuing, to the switching control circuit, a current detection signal based on the potential difference across the ends of the primary switching element. When the primary switching element is OFF, the potential difference across the ends thereof is varied in accordance with the circuit construction thereof. However, during the ON period of the primary switching element, the ON resistance (internal resistance) is substantially constant or, due to non-linearity of the primary switching element, the ON resistance (internal resistance) is varied in accordance with the current flowing. This relationship is one in which, as the conductive current increases, the potential difference across the ends of the primary switching element increases. Therefore, regardless of the circuit construction, the switching control circuit can perform overcurrent protection highly accurately by means of switching control based on the potential difference during the ON period of the primary switching element.

In this invention, the current-detecting circuit is constructed to have voltage dividers each provided between the ends of the primary switching element and a ground potential and an amplifier circuit for differentially amplifying the output voltage of each of the voltage dividers, and a temperature-compensating circuit is provided in the voltage divider. Because of this, errors due to temperature characteristic of conductive current versus ON resistance of the primary switching element can be suppressed. For example, since a MOS-FET shows a characteristic thereof that, under the same current, the ON resistance thereof decreases in accordance with an increase in temperature, when temperature compensation is not performed, the current detection value is decreased though the current value is constant during the ON period. However, when current detection is performed based on the potential difference across the ends of the primary switching element in the above-described manner, by applying temperature compensation, a constant overcurrent protection can be performed over a wide range of environmental temperatures.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
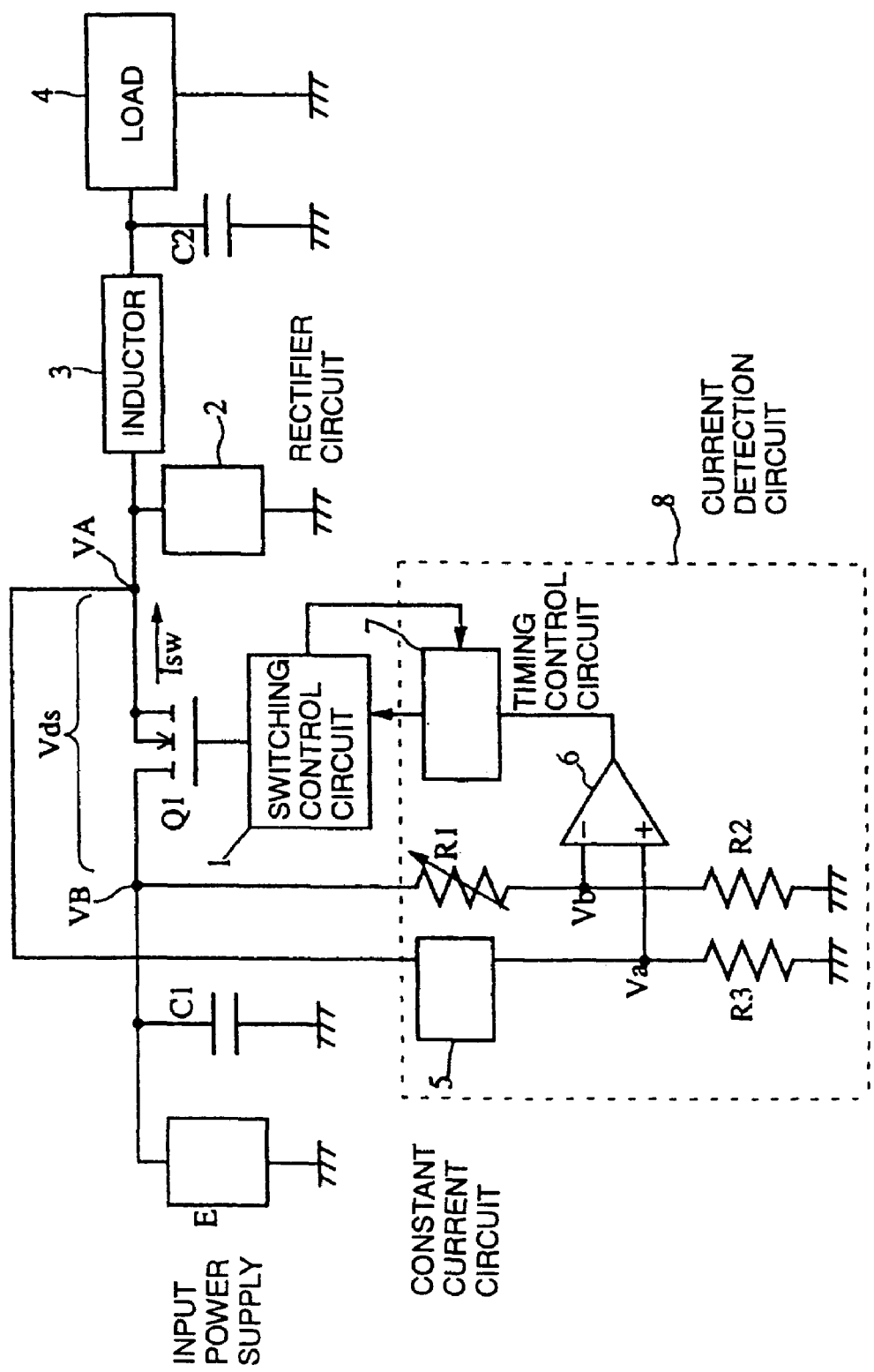
FIG. 1 is a diagram showing the construction of a switching power supply according to an embodiment of the invention.

FIG. 1 shows the construction of a switching power supply according to an embodiment of this invention.

In FIG. 1, Q1 denotes a primary switching element, which is constructed using an N-channel type MOS-FET. A switching control circuit 10 performs on-off control by applying a control voltage to the gate of the primary switching element Q1. An input power supply E is connected to the drain of the primary switching element Q1. The input power supply E is connected in parallel with a capacitor C1. The source side of the primary switching element Q1 is connected to a rectifier smoothing circuit including a rectifier circuit 2, an inductor 3, and a capacitor C2. A resistance voltage divider consisting of a variable resistor R1 and a resistor R2 is provided between the drain of the primary switching element Q1 and the ground. A voltage divider consisting of a constant current circuit 5 and a resistor R3 is provided between the source of the primary switching element Q1 and the ground. Reference numeral 6 denotes a differential amplifier circuit which differentially amplifies the voltage-divided outputs from the two voltage dividers. The switching control circuit 1 outputs a signal representing an ON time (the ON period of Q1) of the primary switching element Q1 to a timing control circuit 7. In accordance with the ON time, the timing control circuit 7 outputs the output voltage of the differential amplifier circuit 6 to the switching control circuit 1.

In the example shown in FIG. 1, the construction of a feedback circuit part for stabilizing the output voltage is not shown. However, in a case in which this switching power supply is used as a constant-voltage switching regulator, the switching control circuit 1 should be constructed to perform switching control by causing the output voltage to be fed back to the switching control circuit 1 so that the output voltage is constant. For example, in a case in which PWM control having a constant period should be performed, the ON duty ratio can be controlled by shortening or lengthening the ON period of the primary switching element Q1 in accordance with rise or fall of the output voltage.

Figure 2:
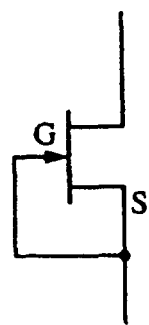
FIG. 2 is a diagram showing an example construction of a constant current circuit in FIG. 1.

The constant current circuit 5 in FIG. 1 is a circuit which takes advantage of a constant-current characteristic as shown, for example, in FIG. 2, obtained by setting the voltage across the gate and the source of a junction-FET to a constant voltage (0V).

Figure 3:
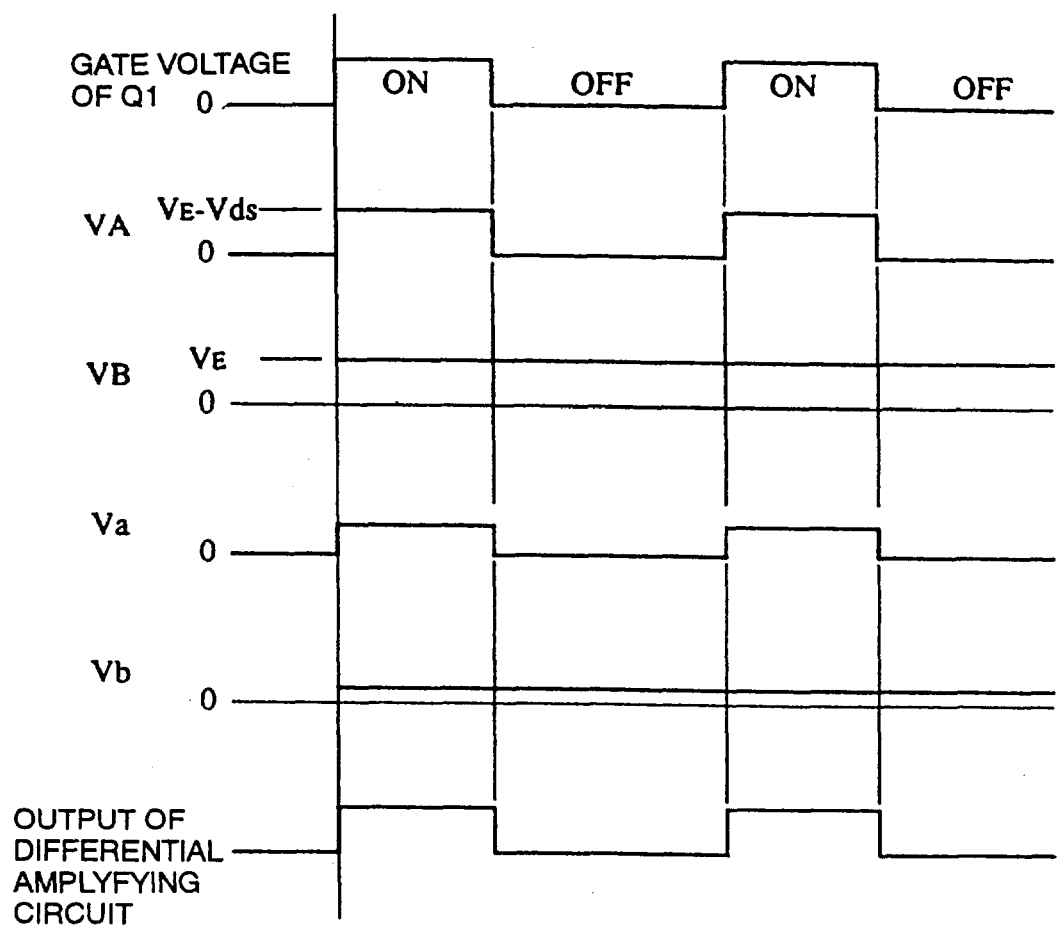
FIG. 3 is a waveform chart of each part in FIG. 1.
Figure 4:
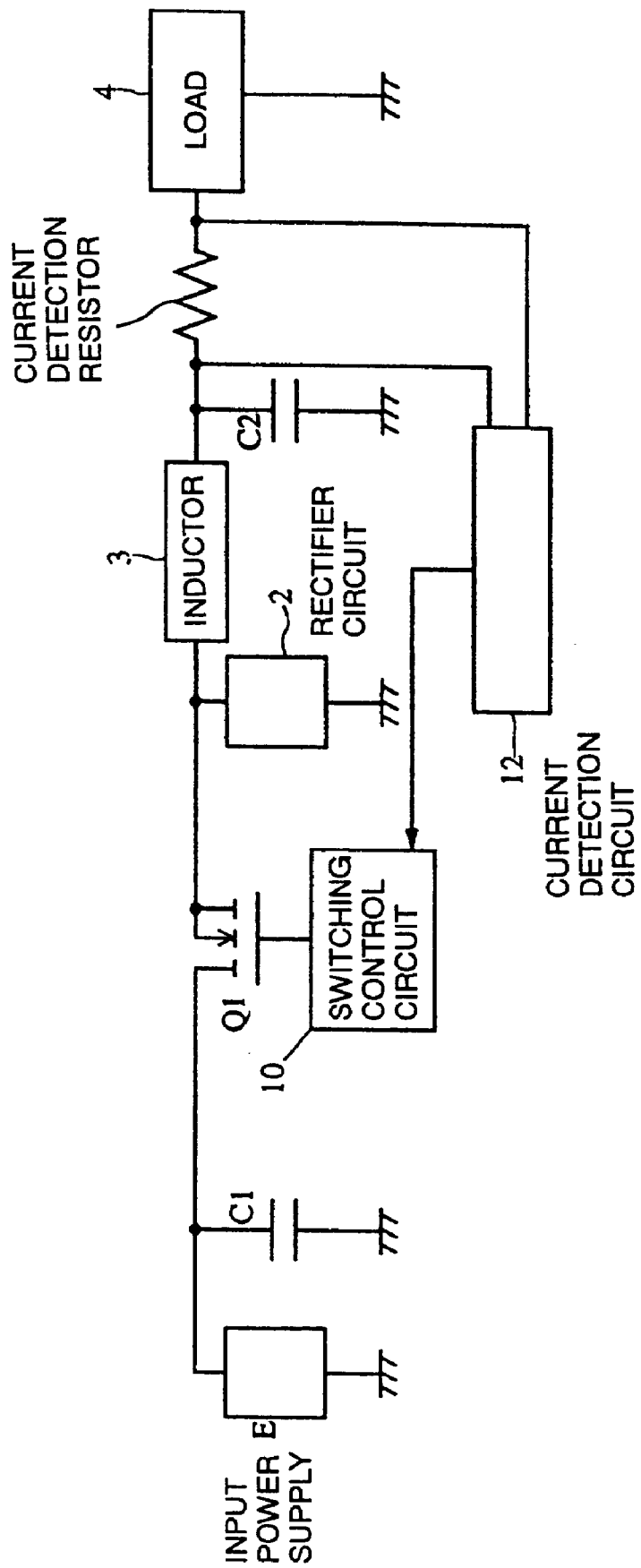
FIG. 4 is a diagram showing the construction of a conventional switching power supply.

FIG. 3 shows waveform charts of each part shown in FIG. 1. When the gate voltage of the primary switching element Q1 is 0 V, Q1 is in an OFF state. When a predetermined gate voltage is applied to the gate of Q1, it is in an ON state. The drain voltage VB of Q1 is a constant input power supply voltage VE. When Q1 is in the OFF state, the source potential VA of Q1 is substantially 0 V. When Q1 is in the ON state, the voltage VA is lower than VB (VE) by a voltage drop Vds. Here, assume that the ON resistance of the primary switching element Q1 is denoted as Ron and the ON-current thereof is denoted as ISW, whereby the relationship among these is represented as follows.

$$VB-VA=Vds=Ron \cdot ISW$$

The output voltage Vb of the voltage divider consisting of the resistors R1 and R2 shown in FIG. 1 is a constant value determined by the ratio of the divided voltages thereof and the voltage VB. The output voltage Va of the voltage divider consisting of the constant current circuit 5 and the resistor R3 becomes a predetermined voltage in accordance with a change of the voltage VA during the ON period of Q1. Accordingly, the output of the differential amplifier circuit 6 is output as a predetermined voltage during the ON period of Q1. During the ON period of Q1, the voltage (voltage drop) Vds across the drain and the source of Q1 increases in accordance with the current ISW and the output voltage of the differential amplifier circuit 6 rises accordingly. Therefore, when the output voltage of this differential amplifier circuit is about to exceed a predetermined threshold value, the switching control circuit 1 performs switching control of the primary switching element Q1 so that the current ISW may not be more than the predetermined threshold value. For example, when switching control is performed by means of PWM control having a constant period, the upper limit of the duration of the ON period is determined. That is, under a condition that makes the voltage value of the output voltage of the differential amplifier circuit 6 equal to the predetermined threshold value, the ON period of Q1 is the upper limit.

In FIG. 1, since there are generally individual differences among the ON resistances Ron of primary switching elements Q1, by adjusting the variable resistor R1 in accordance with the ON resistance Ron of the primary switching element Q1 during use, the reference voltage Vb is adjusted and determined so that the overcurrent protection is activated at a predetermined current value.

When the constant current circuit 5 is constructed as shown in FIG. 2, the constant-current value becomes great in accordance with a rise in temperature. Therefore, the divided voltage ratio of the constant current circuit 5 to the resistor R3 tends to become larger as the ambient temperature becomes higher. On the other hand, since the voltage drop Vds tends to be decreased in accordance with a rise in temperature during the ON period of the primary switching element Q1, the divided-output-voltage temperature coefficient of the voltage divider consisting of the constant current circuit 5 and the resistor R3 is determined so as to offset the influence due to the divided-output-voltage temperature coefficient by causing the divided-output-voltage temperature coefficient to correspond to the ON resistance temperature coefficient of the primary switching element Q1. Thus, constant overcurrent protection can be obtained over a wide range of ambient temperatures. The constant current circuit may be thermally coupled with the primary switching element Q1 by being provided in the proximity of the primary switching element Q1 so that the constant current circuit detects the temperature of the primary switching element Q1 in a highly precise manner. Alternatively, the constant current circuit 5 is constructed using a resistance element simply having a predetermined temperature characteristic.

In this embodiment, by providing the timing control circuit 7, the output voltage of the differential amplifier circuit is arranged to be output to the switching control circuit during the ON period of Q1. However, by arranging the output voltage of the differential amplifier circuit 6 so as to be substantially 0 V during the OFF period of Q1, the output voltage of the differential amplifier circuit 6 may be constructed so as to be simply smoothed and then output to the switching control circuit 1.

A buck type switching power supply is shown in the example shown in FIG. 1. However, the present invention is applicable in the same manner to a boost type switching power supply, a buck-boost type switching power supply, and a forward-type or a flyback-type switching power supply using a transformer because there is a relationship between the value of the current flowing in the primary switching element during the ON period of the primary switching element and the value of the output current flowing through the load.

As the primary switching element Q1, apart from the N-channel-type FET, a P-channel type FET may be used. Furthermore, an NPN-type or a PNP-type bipolar transistor may be used.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply comprising:

a primary switching element having main switched terminals for controlling an output voltage or an output current by switching the current of an input power supply circuit;

a current detection circuit for detecting a current flowing through said primary switching element, based on the potential difference occurring across the main switched terminals of said primary switching element; and a switching control circuit coupled to the current detection circuit for controlling said primary switching element so that the current does not exceed a predetermined value;

wherein the current detection circuit has respective voltage dividers each provided between a main terminal of said primary switching element and a ground potential and an amplifier circuit for differentially amplifying the output voltage of each of said voltage dividers; and a temperature compensating circuit is provided in at least one of said voltage dividers.

2. The switching power supply of claim 1, wherein a timing control circuit is provided for issuing, to said switching control circuit, a current detection signal based on said potential difference when said primary switching element is turned on.

3. The switching power supply of claim 1, wherein the temperature compensating circuit comprises a constant current circuit.

4. A method of regulating an output of a switching power supply comprising the steps of:

controlling a primary switching element having main switched terminals thereby to control an output voltage or an output current by switching the current of an input power supply circuit;

detecting a current flowing through said primary switching element, based on the potential difference occurring across the main switched terminals of said primary switching element; and controlling said primary switching element based on detecting the current flowing through the primary switching element so that the current does not exceed a predetermined value;

further comprising providing respective voltage dividers each provided between a main terminal of said primary switching element and a ground potential and differentially amplifying an output voltage of each of said voltage dividers; and compensating for temperature by providing a temperature compensating circuit in at least one of said voltage dividers.

5. The method of claim 4, further comprising issuing a current detection signal based on said potential difference when said primary switching element is turned on.

6. The method of claim 4, wherein the step of temperature compensating comprises providing a constant current circuit.

7. The method of claim 4, further comprising regulating the output current or the output voltage so as to provide overcurrent protection for said switching power supply.

* * * * *